United States Patent [19]
Anthony

[11] Patent Number: 5,489,980
[45] Date of Patent: Feb. 6, 1996

[54] APPARATUS FOR RAPID AND ACCURATE ANALYSIS OF THE COMPOSITION OF SAMPLES

[76] Inventor: Michael Anthony, 11899 NW. 31 St., Coral Springs, Fla. 33065

[21] Appl. No.: 439,436

[22] Filed: May 11, 1995

Related U.S. Application Data

[63] Continuation of Ser. No. 853,424, Mar. 18, 1992, abandoned.

[51] Int. Cl.⁶ .................. G01J 3/06; G01J 3/20; G01J 3/10
[52] U.S. Cl. .................................. 356/308; 356/328
[58] Field of Search .................................. 356/305, 308, 356/320, 326, 328

[56] References Cited

U.S. PATENT DOCUMENTS

| | | | |
|---|---|---|---|
| 4,191,473 | 3/1980 | Hansch | 356/328 |
| 4,441,814 | 4/1984 | Buchanan | 356/305 |
| 4,540,282 | 9/1985 | Landa et al. | 356/328 |
| 4,669,878 | 6/1987 | Meier | 356/319 |
| 4,880,752 | 11/1989 | Keck et al. | 356/317 |
| 4,969,740 | 11/1990 | Sonobe | 356/328 |
| 4,970,054 | 11/1990 | Mori | 422/108 |
| 4,980,278 | 12/1990 | Yamada et al. | 356/436 |
| 4,983,039 | 1/1991 | Harada et al. | 356/328 |
| 4,989,932 | 2/1991 | Landa et al. | 356/440 |
| 5,006,314 | 4/1991 | Gourley et al. | 356/39 |
| 5,020,909 | 6/1991 | Landa | 356/300 |
| 5,044,747 | 9/1991 | Anthony | 356/246 |
| 5,044,755 | 9/1991 | Landa et al. | 356/440 |
| 5,047,208 | 9/1991 | Schweitzer et al. | |
| 5,064,619 | 11/1991 | Finlan | 356/318 |
| 5,210,590 | 5/1993 | Landa et al. | 356/319 |

FOREIGN PATENT DOCUMENTS

| | | | |
|---|---|---|---|
| 83922 | 4/1986 | Japan | 356/326 |
| 787909 | 12/1980 | U.S.S.R. | 356/305 |
| 883471 | 11/1961 | United Kingdom | 356/305 |

Primary Examiner—F. L. Evans
Attorney, Agent, or Firm—Holland & Knight

[57] ABSTRACT

An apparatus comprising two light sources, a composite detector, a fixed grating, two independent slits and a mask with a multiplicity of slits analyzes the spectral composition of samples rapidly and accurately and can transmit such information to other locations by modem. A first light source produces a spectrum with broad spectral range, a second light source produces a spectrum with multiple sharp spectral features. The first and second light sources are used to produce a sample spectrum and a reference spectrum respectively. A portion of the light from each of the two sources is used to calibrate the intensity of the instrument at each wavelength measurement. Rapid scanning is achieved by continuous multiplexing of each wavelength of light to the detector using a rotating mask with a multiplicity of slits. Continuous wavelength calibration is achieved by using the reference spectrum to encode a wavelength scale as spectrum is acquired. The spectral data can be transmitted by the said apparatus to other locations by modem. The said modem enables a multiplicity of the said apparatus to be used at various locations to perform a common analysis function. For example, a city wide medical network of analyzers may be set up to communicate with a central data base, where analyses on clinical assays may be performed by powerful dedicated computers. In another example, a network of the said apparatus may be set up in an integrated manufacturing environment such as a tobacco manufacturing plant or pharmaceutical manufacturing plant, to accumulate data at several points in the manufacturing process. The apparatus, may be used to rapidly scan and analyze discrete moving samples for composition analyses, density determination, moisture determination, color, and surface uniformity.

13 Claims, 10 Drawing Sheets

APPARATUS FOR RAPID AND ACCURATE ANALYSIS OF THE COMPOSITION OF SAMPLES

This is a continuation of application(s) Ser. No. 07/853,424 filed on Mar. 18, 1992 abandoned.

FIELD OF THE INVENTION

This invention relates to the field of spectroscopy.

BACKGROUND OF INVENTION

General

Spectroscopy is a method of measurement of the absorption and emission of electromagnetic waves by substances. When polychromatic light is directed at a sample, the sample attenuate different wavelengths of the electromagnetic spectrum in a specific way. This allows different materials to be readily identified by their spectral signature. For example, helium gas was first discovered by identification of it's unique signature in the sun's spectrum. The near infrared (NIR) region of the electromagnetic spectrum is particularly useful for analyzing samples of complex composition.

The said NIR region lies between the visible region and the infrared region of the electromagnetic spectra extending from 700 to 2600 nanometers. The bulk of NIR spectrum arise as a result of vibrational overtone stretches of the OH, NH, and CH groups of chemical bonds which are present in natural and man made products such as blood serum, plastics, tobacco and food products.

Present day near infrared spectroscopy is an analytical technique of wide applicability and requiring minimum sample preparation. Sampling can be performed without contact, generally requires no sample pre-treatment or separation techniques. The major advantage of NIR spectroscopy lies in its large signal to noise ratio, making it possible to analyze even trace constituents accurately, without the use of expensive Fast Fourier Transform analyzers (FFT). Furthermore, modern statistical analytical methods such as expert chemometric models, coupled with specialized sampling accessories such as fiber optic probes and flow cells, allow a wide variety of materials and mixtures to be readily analyzed in the NIR region of the spectrum. Expert chemometrics modelling allows multicomponent analysis of complex mixtures, or matrices, based on the knowledge of the underlying spectroscopy. Special algorithms allow an analyzer to measure qualities such as shelf life, tackiness, taste, and uniformity in addition to sample composition, in a non-invasive manner.

Minimal sample preparation and rapid analysis yield strong advantages over the conventional laboratory methods of chemical analysis. Laboratory methods of chemical analysis, though very accurate, can be labor intensive and time consuming. These drawbacks coupled with the possibility of sample contamination by human errors make NIR spectroscopy a desirable analytical tool. However, spectroscopic analysis methods can only yield results that are as accurate as the primary calibration method used to calibrate the analyzer. But by continuous calibration using all possible sample types within a measurement, errors can be minimized to yield a high degree of confidence in the method.

There are many areas in which NIR spectroscopy is successfully applicable. These include: the tobacco industry, pulp and paper industry, petrochemicals, biomedical, pharmaceutical, foods and beverages. The bio-medical industry is a particularly interesting field of application. NIR spectroscopy has been very successful as a fundamental analytical technique for effecting biomedical assays. Multiwavelength NIR spectroscopy, combined with sophisticated data analysis technics based on multivariate statistics, offer an attractive alternative to conventional analysis methods. The recent developments in Neural Network technology has added the advantage of nonlinear modelling for analysis of samples exhibiting high variability.

Instrumentation

Current designs of near infrared analyzers involve either a stationary grating or a moving grating. Moving grating instruments are slow cumbersome and susceptible to mechanical errors due to the large mass of the grating. They have the advantage of using a single detector element. The speed of such instruments may reach 10 scans per second, limiting their use to single applications when the number of scans needed to make significant statistical measurement is greater than the instrument scanning speed. Landa et al discloses such an analyzer in U.S Pat. No. 4,540,282. On the other hand, the stationary grating instruments are fast but not as accurate as the moving grating instruments. Their speed is primarily due to the use of diode array detectors with well over 200 separate elements, which simultaneously measure the spectrum energy levels. Each element measures a fixed segment of the spectrum produced by a spectrograph, so that the resolution of the spectrum recorded depends primarily on the number of diodes used. Detector array elements tend to have slightly different drift characteristics, thereby requiring expensive electronics for making corrections to the spectrum. Diode array systems of current designs are very expensive and still not fully developed, making the currently available technology too expensive for most applications where multiple analyzers may be required.

State of the art wavelength and intensity calibration technics

So far, state of the art analyzers cannot effectively compensate for rapid variations in the measurements resulting from the harsh conditions of a manufacturing environment without dedicating considerable time to measuring separate "reference" scans. This limits the rate of actual sample analyses considerably. The user must trade accuracy of measurement of sample scans for speed. The wavelength referencing methods used by these analyzers, depends on sequentially comparing a reference spectrum with the sample spectrum to obtain corrections for the said sample spectrum. U.S Pat. No. 5,020,909 to Landa et al discloses such a method. In the Landa patent, the reference spectrum is sequentially convalued with the sample spectrum and then extracted by mathematical means before correction of said sample spectrum is done. The technique employed by Landa et al. depends on time sharing the analyzer between the said reference scans and sampling scans. The extracted reference spectrum is then compared to the known reference spectrum in order to obtain the corrections for the wavelength shifts that may have occurred during data acquisition on said reference spectrum. In fact, the reference spectrum must be corrected prior to correcting the sample spectrum. The correction factors for said reference spectrum are assumed to be valid for the sample spectrum correction also. The method also depends on convolution of the reference spectrum and the sample spectrum.

The process of convolution is time consuming and presents certain difficult mathematical problems. The general mathematical definition of convolution is as follows:

If a function f(t) is convalued with g(t), then $$f(t) * g(t) = \int_0^x [f(x)g(t-x)]dx$$

where * is the convolution operation and x and t are independent variables.

It is thus clear that the process of convolution involves continuous shifting of one spectrum with respect to another and integrating the product of the overlapping spectra. The light is first attenuated by the reference material and then attenuated by the sample. Although Landa et al. does not outline the means of performing the convolution it is clear that several possible outcomes could result from a mathematical deconvolution process. Also the spectrum of the said reference material could in fact be superficially affected by pathlength changes or sample chemistry changes in the reference material. The Landa et al. disclosure does not distinguish between the effects of instrument variation during the acquisition of said reference spectrum from the effects of instrument variation during the acquisition of the sample spectrum. The Landa disclosure assumes that the errors found by comparing the "deconvoluted" spectrum of the reference material to a known reference spectrum of the said reference material are identical to the errors that will have occurred during the acquisition of the said sample spectrum. This may not be the case for samples with high variability. There are two examples for which the said Landa et al. disclosure cannot produce accurate results. Firstly, if the sample were taken to be a spectroscopically clean stable sample in an evacuated chamber with no mechanical or thermal stresses, variations in the reference material, sampling accessories, analyzer electronics and optical components would result in variations in the deconvoluted spectrum of the said reference material from the known spectrum of the said reference material. The Landa et al. patent discloses a method which will employ these measured variations to correct the spectrum of an essentially spectroscopically clean sample, thereby defeating the purpose of the method. Secondly, if the sample was on a fast moving conveyor belt, spectral shifts caused by one portion of the said sample would result in corrections of the spectrum of another portion of the said sample spectrum. This type of correction is referred to as cross correction. The method disclosed by Landa et al. is therefore not suitable for fast moving samples or spectroscopically clean samples. The present invention addresses the need for high speed accurate scanning and analyses of samples in industrial environments particularly for sorting application, without the drawbacks of diode array based analyzers, moving grating based analyzers and cross correction. A novel wavelength referencing method is disclosed by the present invention, which addresses the need for simultaneous correction of a sample spectrum without need of separate reference scans.

SUMMARY OF INVENTION

The apparatus of this disclosure consists of a first broad spectrum light source; a second reference light source with multiple sharp spectral peaks and greater intensity than the first light source; a spectrograph with two separate entrance slits, a concave holographic diffraction grating and a composite light sensitive detector element with first and second detection surfaces; a motorized mask with multiple slits; and electronic circuits. Rapid scanning is achieved by using a stationary optical arrangement for the spectrograph and uniform speed rotation of the mask in front of the detector element to multiplex each wavelength of the spectrum unto the first sensitive surface of the detector element. The spectrograph is constructed with a first entrance slit and a second entrance slit symmetrically placed on the "normal plane" of the grating at equal angular orientations from the "grating normal" of the grating. The "grating normal" of the grating is the hypothetical line which forms the axis of cylindrical symmetry of the concave grating. The "normal plane" of the concave grating is the horizontal plane in which lies the center of the concave grating and the grating normal. The normal plane is perpendicular to the first and second entrance slits, so that the slits are vertically oriented. The grating disperses the incident light from the sample into a "sample spectrum" of finite spatial distribution at a fixed focal plane of the grating. The spectral lines are vertical on the focal plane, and each spectral line is centered on the normal plane of the grating. The focal plane of the grating is perpendicular to the normal plane of the grating and located at a finite distance from the grating.

The light from the sample is directed at a first entrance slit of the spectrograph, from which thereof it is made incident on the surface of the concave holographic grating of the said spectrograph at a fixed incident angle $\alpha$ with respect to the grating normal.

The light from the reference light source is directed at a second entrance slit of the spectrograph and made incident upon the grating at an angle $\beta$ to the normal of the grating. In the uncalibrated configuration of the apparatus, the angle $\beta$ is equal to the angle $\alpha$.

In a calibrating mode, the angle $\beta$ can be varied by moving the second entrance slit of the spectrograph using a motor and electronic controls, or by manual rotation of a knob on the apparatus. The light from the said second entrance slit is also dispersed into a "reference spectrum" at the focal plane of the grating. The spatial distribution of the "reference spectrum" can be shifted with respect to the spatial distribution of the "sample spectrum" by changing the angle $\beta$ of the second entrance slit with respect to the grating normal within the normal plane of the grating. The energy distribution of the grating is such that it will focus the light from the entrance slits, at the same focal plane with respect to the grating normal when the entrance slits are symmetrically placed with respect to the grating normal ($\alpha=\beta$), and centered on the normal plane. The position of the second entrance slit relative to the first entrance slit can be adjusted in order to shift the reference spectrum with respect to the sample spectrum. The position of the first entrance slit is fixed with respect to the concave grating. This also makes the position of the sample spectral distribution on the focal plane fixed. The motorized mask is positioned at the focal plane of the grating to completely block off the spectra from reaching the first sensitive surface of the detector element. The motion of the masked disc allows each slit to "chop" the entire spectral region sequentially by allowing a single wavelength at a time through the slit as it moves across the spectrum, to be measured by the first sensitive surface of the detector element. A first light guide member collects a fixed portion of the light from the sample for intensity calibration measurements by the second sensitive surface of the detector element. A second light guide member collects a fixed portion of the reference light for intensity calibration measurements by the second sensitive surface of the detector element. The second sensitive surface of the detector is continuously exposed to the superimposed light of the said first and second light guide members. The second sensitive surface of the said detector produces a continuous analog "intensity calibration" electrical signal which corresponds to the combined intensity of the light emitted by the first and the second light guide members.

An Analog to Digital Converter (ADC) is used to convert the said analog "intensity calibration" electrical signal into digital information at a fixed sampling rate. The digitized "intensity calibration" electrical signal is stored in the memory of a microprocessor for intensity calibration at each wavelength point of the measured spectrum.

The superimposed spectra of the sample light and the said reference light source is "chopped" by each slit of the mask in order to allow the intensity of each wavelength of light of the superimposed spectrum to be measured by the first sensitive surface of the detector element. The design of the mask is such that only one slit of the mask is exposed to the superimposed spectra at any given instant in time. The detector element produces an analog "spectral intensity" electrical signal whose strength corresponds to the intensity of the superimposed spectra at each point of the spectral distribution as measured by the first sensitive surface of the detector element. The analog "spectral intensity" electrical signal is digitized at a fixed sampling rate by another Analog to Digital Converter (ADC) and stored in the memory of the microprocessor as spectral information. The microprocessor controls the two ADCs and synchronizes the sampling of the two signals produced by the detector element. The microprocessor determines the location of the spectral, peaks of the reference light source with respect to the number of A to D sample counts and uses the known spectral features of the reference light source to automatically generate a wavelength scale for the measurements.

A calibration routine allows the known spectral peaks of the reference spectrum to be used to map the wavelength scale of the sample spectrum. The wavelength region of interest, for measuring the sample spectrum is chosen by electronically or manually positioning moving the second entrance slit to position the reference spectrum evenly across the spatial spectral distribution of the sample spectrum in the region of interest on the focal plane of the superimposed spectra. This manipulation of the reference spectrum can be compared to positioning an optical measuring rod across the sample spectrum in the region of interest in order to generate a wavelength scale for the region. The properties of such a hypothetical measuring rod would be correlated to the optical properties of the spectrograph. Thus if the spectrograph causes any change in spatial distribution of the sample spectrum, the same changes will automatically occur in the reference spectrum, nullifying the effects of such a change. The light intensity of the spectrum at each point of the spectral distribution is automatically determined by the microprocessor using the combined digital signals from the two sensitive surfaces of the detector element. The microprocessor uses the digitized intensity calibration electrical signal obtained from the second sensitive surface of the detector element to obtain accurate sample spectral intensity information at each wavelength. The method of Continuous Wavelength Calibration disclosed herein allows the wavelength scale to be dynamically imprinted on the said detector element at each and every scan cycle of the apparatus. Because there is no time difference between a sample measure scan and a wavelength reference or calibration scan, the wavelength scale generated for the measurement is very accurate. The potential errors introduced by conventional methods involving the use of an encoder to determine the spatial location of the rotating mask in order to define a wavelength scale are completely eliminated by the present invention, since the reference wavelength scale so generated by this invention is ultimately determined by the spectrum of the second reference light source and not by an independent entity such as an encoder. A variation in the properties of the grating cannot affect the said wavelength scale generated by the method here described, since such a variation is automatically corrected by equal variation in the reference spectrum scale. Variation in the rotational speed of the rotating mask is accounted for by the present invention, since the rotational speed of the mask can be determined by knowledge of the location of the second reference light source spectral peaks and the time difference separating the peaks as measured by an electronic clock. The method of Continuous Intensity Calibration disclosed herein automatically accounts for any external variations in light intensity caused by either ambient light, temperature fluctuations of sample, discontinuities in the sample, sudden changes in the voltages of both the reference light source and the primary light source of the said apparatus.

A modem installed in the apparatus, allows the apparatus to receive and transmit data using existing telecommunication networks.

DESCRIPTION OF THE PREFERRED EMBODIMENT

While this invention is satisfied by embodiments in many different forms, there will herein be described in detail the preferred embodiment of the invention, with the understanding that the present disclosure is to be considered as exemplary of the principles of the invention and is not intended to limit the invention to the embodiment illustrated and described. The scope of the invention will be measured by the appended claims and their equivalents.

Figure 1:
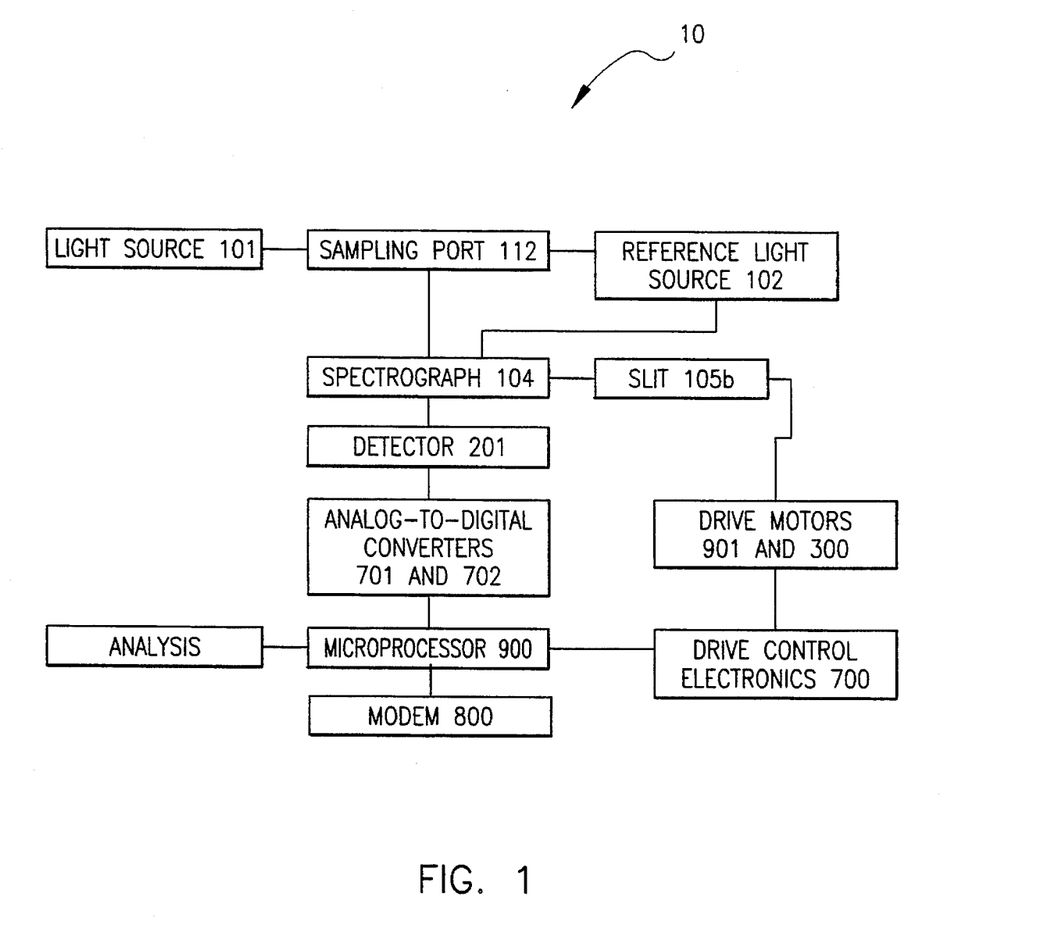
FIG. 1 is a block diagram of the apparatus of the present invention.
Figure 2:
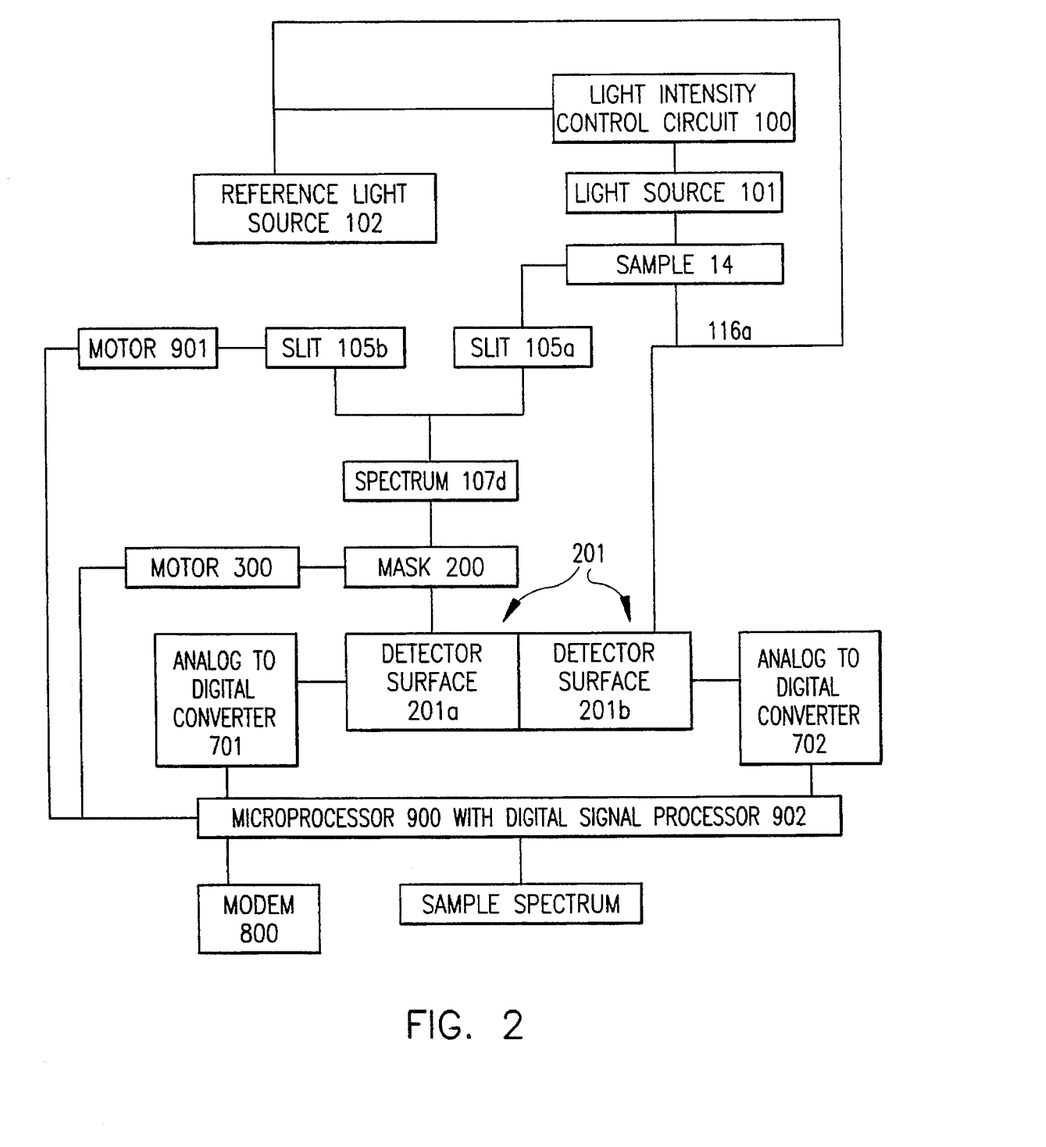
FIG. 2 is a block diagram of the electro-optical arrangement of the apparatus of FIG. 1.
Figure 3:
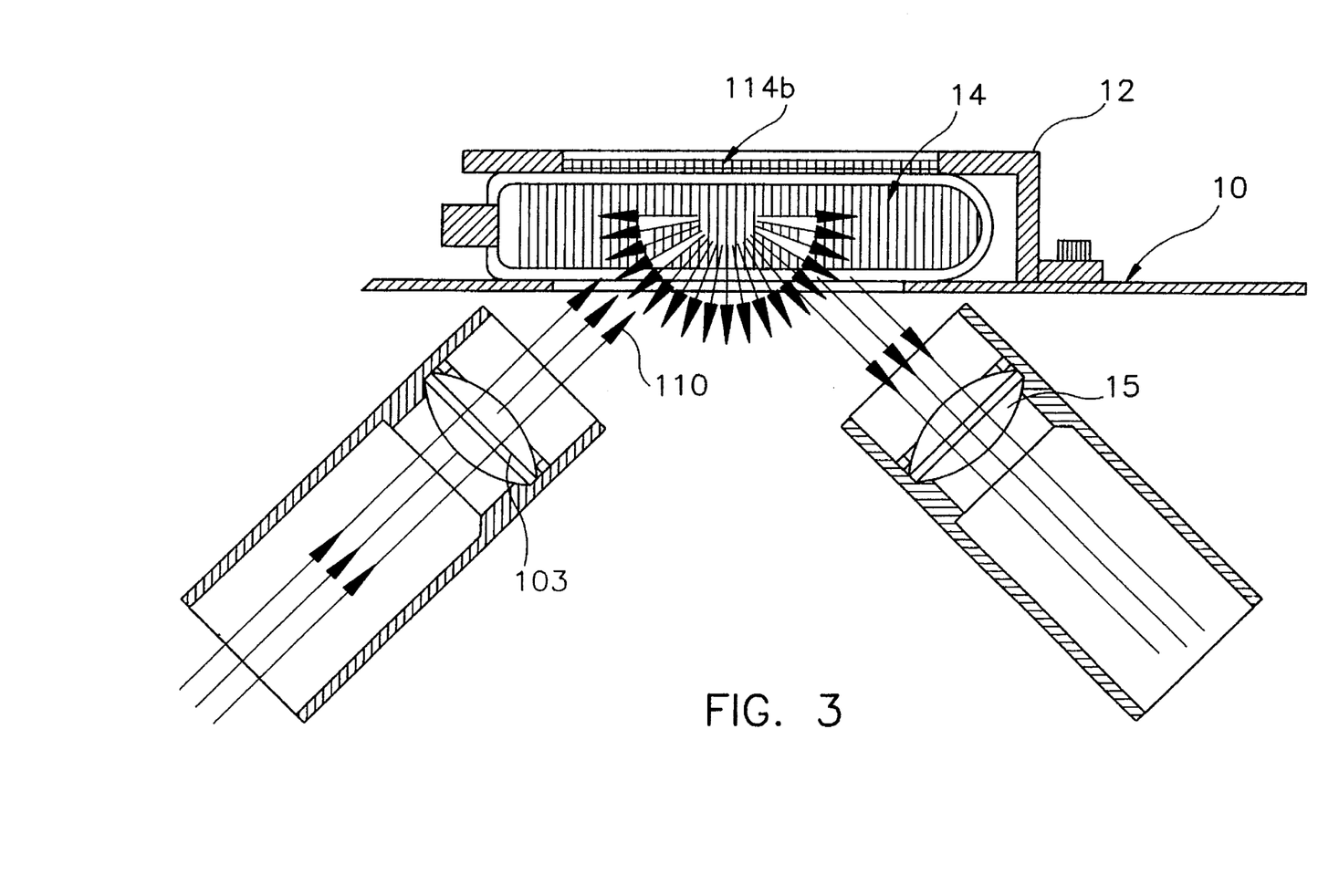
FIG. 3 is a simplified drawing of the optical arrangement of the apparatus at the exit port in reflectance mode.
Figure 4:
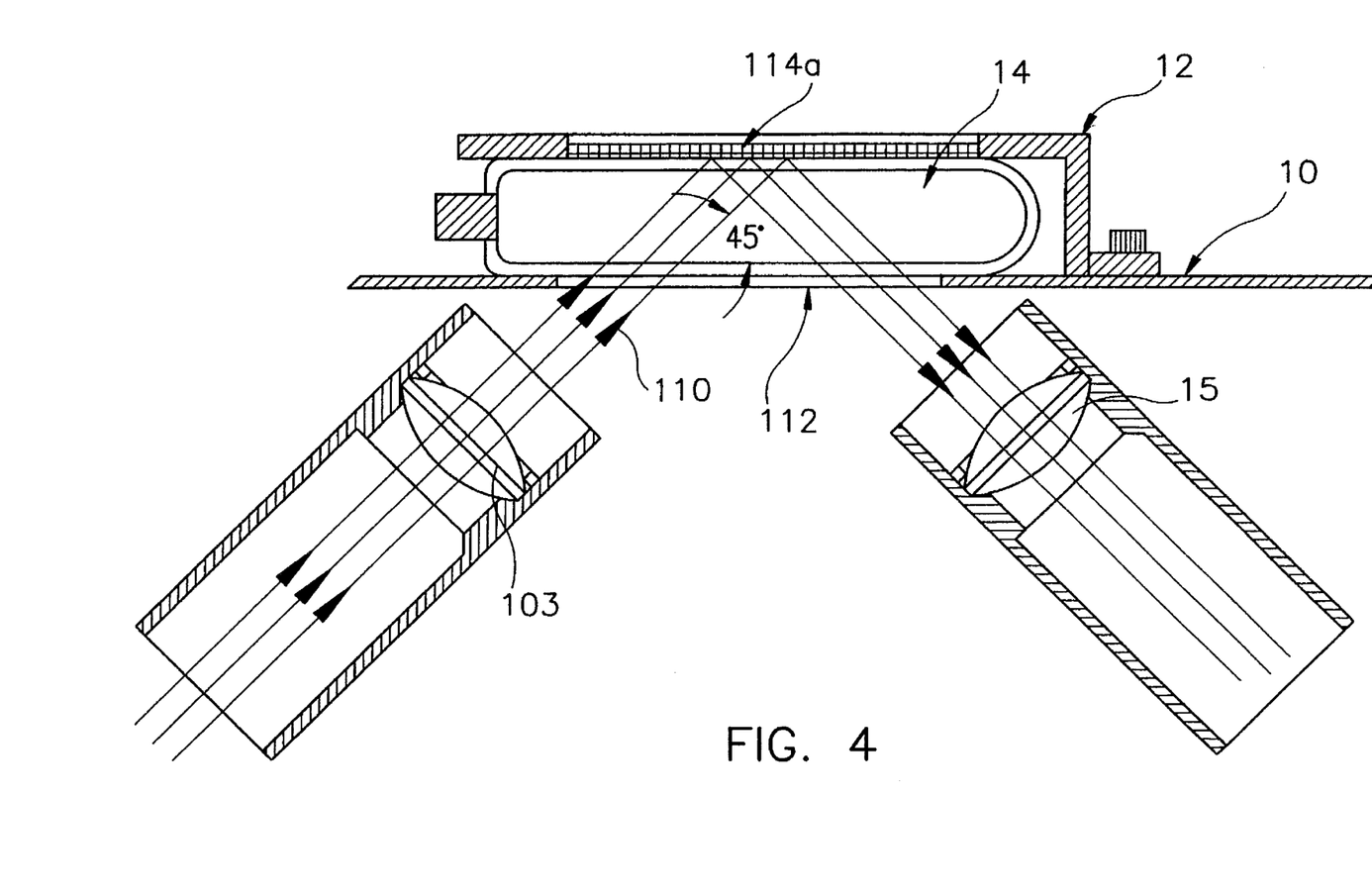
FIG. 4 is a simplified drawing of the optical arrangement of the apparatus at the exit port in transmission mode.
Figure 5:
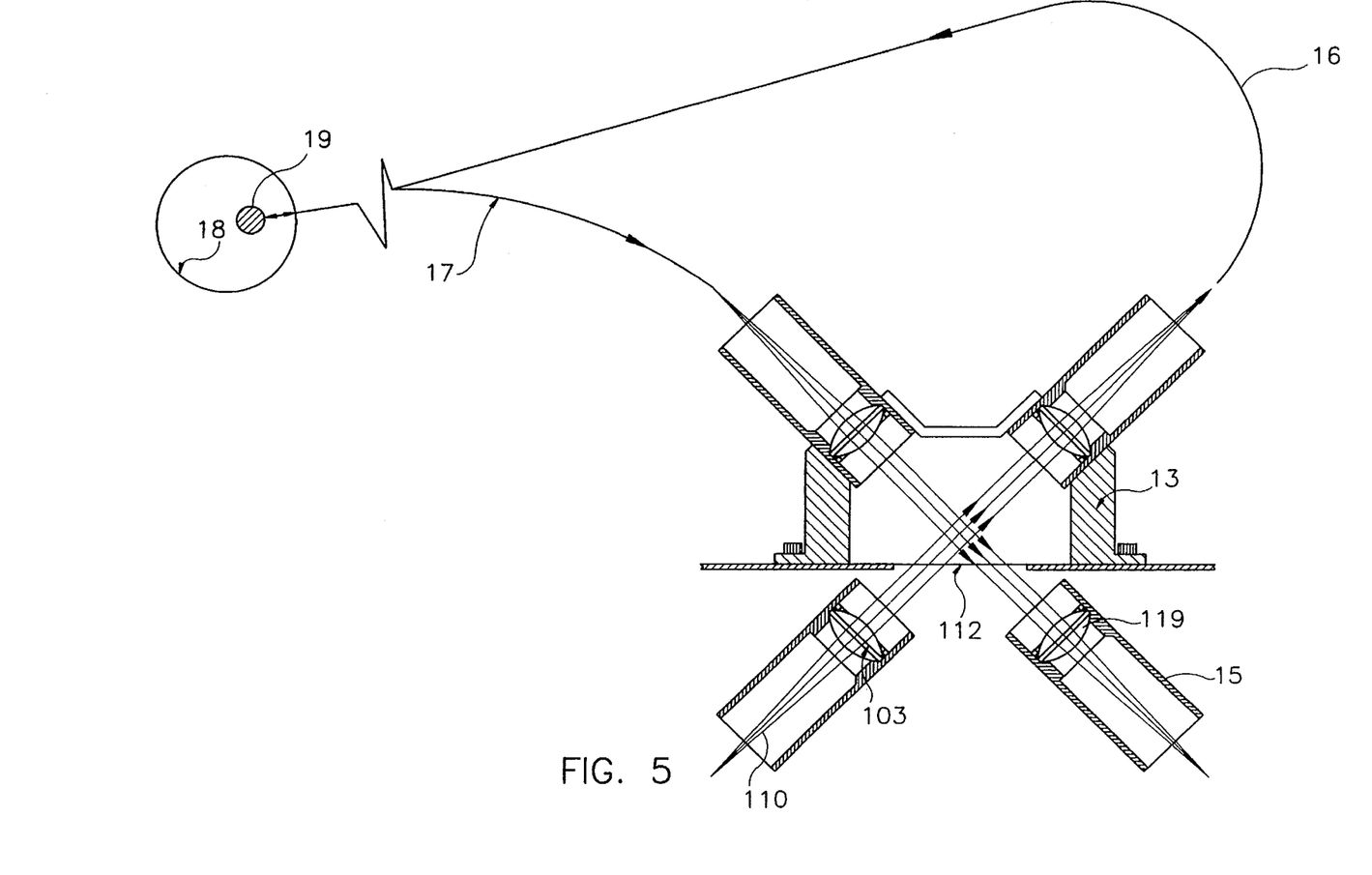
FIG. 5 is a representative drawing of the fiber optic light guide coupling of the apparatus.

The apparatus 10 comprises: a first light source 101, a second or reference light source 102, collimating lens 103, collimating lens 118 (FIG. 6), a spectrograph 104, a motorized mask 200 with a geometric pattern of slits, a photo detector 201 with two separate detection surfaces 201*a* and 201b electronics 700 shown in FIG. 1, a modem 800 and a microprocessor 900. The apparatus 10 is designed to capture a complete spectrum of a sample with high resolution and high speed using a stationary electro-optical arrangement and rotating mask 200. The spectrograph 104 includes a concave holographic grating 106, a first fixed entrance slit 105a and a second adjustable entrance slit 105b. Grating 106 disperses light from each of the said entrance slits 105a and 105b into two distinct flat field spectra 107a and 107b with uniform wavelength distributions. The relative positions of the said entrance slits 105a and 105b can be adjusted dynamically to generate spatially independent spectra 107a and 107b of the reference light source and the sample respectively, or superimposed spectra 107d of the reference light source and the sample spectrum. First light source 101 produces light with a broad spectrum in the spectral region of interest. Second or reference light source 102 produces light with multiple sharp spectral features in the spectral region of interest. Light from the said first light source 101 is collimated into beam 110 by the collimating lens 103. The beam 110 is directed at an exit port 112 of apparatus. Exit port 112 of the apparatus 10 can be fitted with either a sample holding device 12 or a fiber optic light guide coupling 13. The construction of the said fiber optic wave guide coupling 13 is shown in FIG. 5.

When apparatus 10 is fitted with a sample holder 12, it can be described as being adapted for use in a direct mode. When apparatus 10 is fitted with a light guide coupling 13, it can be described as being adapted for use in remote mode.

Direct Mode

In the direct mode, light 110 from the said first source 101 is made to strike a target sample 14 at an incidence angle of 45° in the horizontal plane. The incident light is either transmitted through sample 14, or reflected in a specular fashion from sample 14. For transmission measurements in the direct mode, a highly reflective surface 114a such as a mirror with a broad spectral range is placed on sample holder 12, so that the transmitted light is redirected into collection optics 15 of the apparatus 10 at 90° to incident beam 110a in the horizontal plane. The horizontal plane will here be take to be the hypothetical plane on which lies the center of the grating, the grating normal and the center of the two slits. For reflectance measurements on a sample, a diffuse reflector 114b such as ceramic is placed on sample holder 12, so that the specular reflectance of the said sample is redirected into the collection optics 15 of apparatus 10. This configuration is suitable for slurries, powders, colloids and solids. Such materials may include tobacco, pulp and paper, resins or pastes.

Remote Mode

FIG. 5 is a representative drawing of the fiber optic wave guide coupling of the apparatus at the exit port in Remote mode.

In Remote Mode, exit port 112 is fitted with a light guide coupling 13. The light 110 from the first source is focussed by the said coupling 13 into a first end of a light guide 16. Light guide 16 is constructed of materials such as fuzed quartz or fuzed silica, suitable for transmission of the desired spectral range. The light transmitted by light guide 16 is emitted at a second end and directed to a remote sampling device 18 such as a fiber optic probe or a flow cell. Such devices are described in U.S. Pat. No. 5,044,747 to Anthony et al, and U.S. Pat. No. 5,044,755 to Anthony et al. The light 110 may also be directed into a light multiplexing device to provide light to a plurality of sampling devices such as 18.

U.S. Pat. No. 4,989,932 Anthony et al describes such a multiplexing device.

Sampling device 18 is designed to direct the light 110 at a target sample 19 in order to make reflectance or transmission measurements. The probes or flow cells may be constructed to suit the conditions that the sample must maintain during measurements. A second light guide 17 collects the reflected light from the said sample at a first end, and transmits the light through a second end attached to collection optics 15 in apparatus 10.

Figure 6:
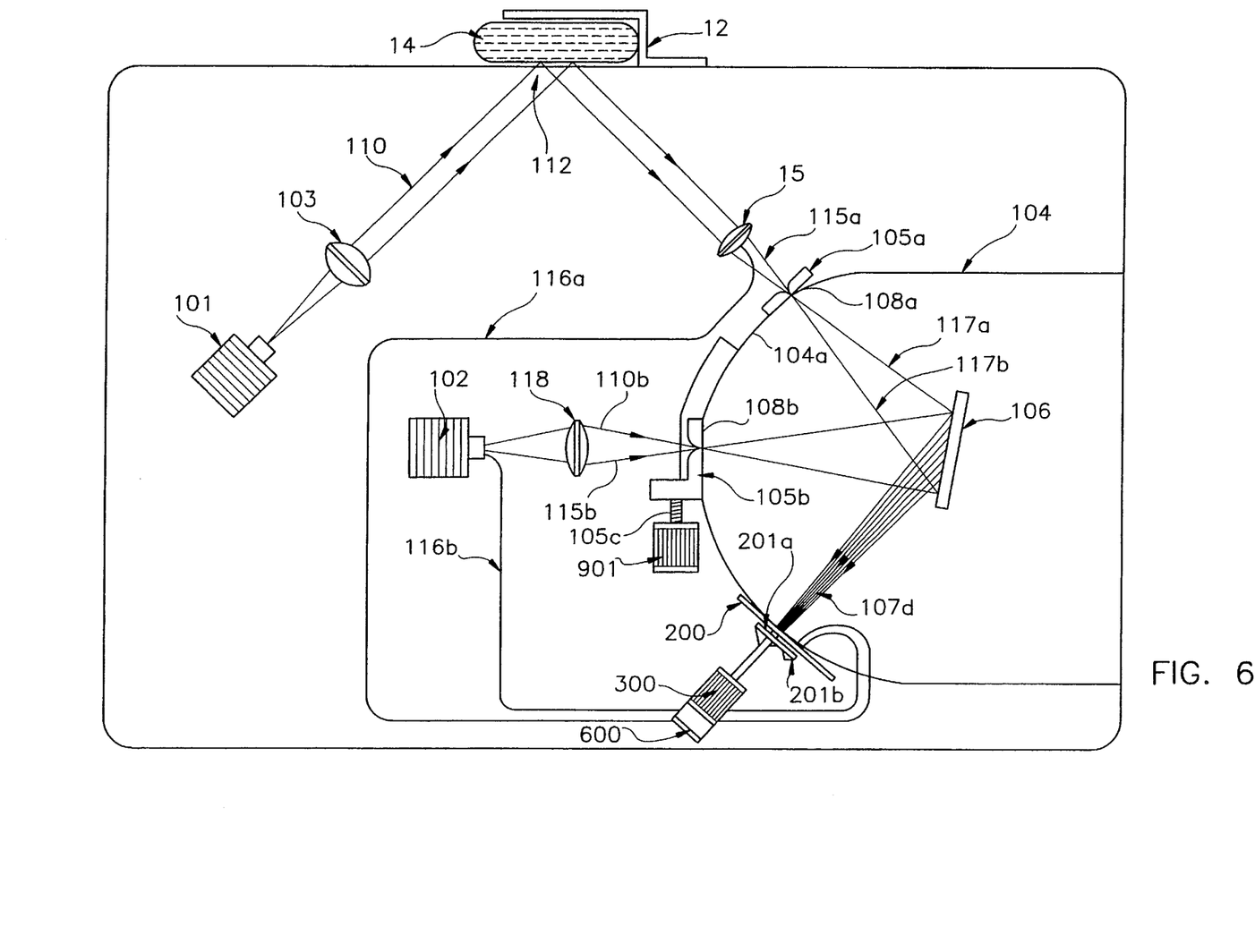
FIG. 6 is a representative drawing of the optical arrangement of the instrument in the direct mode.

FIG. 6 is a representative drawing of the optical arrangement of the apparatus in the direct mode.

In both the direct and remote modes, collection optics 15 focus a portion of the collected light into a beam 115a at a first stationary entrance slit 105a of spectrograph 104. The remaining portion of the beam 115a is collected by the first end of a light guide 116a. While light guides 16 and 17 (FIG. 5) may be detached from the apparatus, light guide 116a is a permanent but replaceable component of apparatus 10.

Slit 105a is used to reduce the incident beam 115a into a line source 117a for spectrograph 104. Slits 105a and 105b lie in a vertical plane to the normal plane of grating 106. The said normal plane of grating 106 is the hypothetical horizontal plane on which lies on the axis of cylindrical symmetry of the grating 106. The grating normal is the hypothetical axis of cylindrical symmetry of grating 106. The said normal plane is perpendicular to entrance slits 105a and 105b which are vertically oriented with respect to the said normal plane. Grating 106 disperses the incident light from the sample into a "sample spectrum" of finite spacial distribution at a fixed focal plane 107c (FIG. 7) whose spatial location is determined by grating 106. The focal plane 107c of grating 106 is perpendicular to the normal plane and located at a finite distance from grating 106. A line source increases the wavelength resolution of the diffracted light from a spectrograph by resolving the said spectrum into imaged lines of different wavelength with about the same spacial width as the said slit. It is desirable to make all slits of the apparatus 10 as small as possible in order to increase the wavelength resolution of the apparatus. The light 117a from slit 105a is made to fill grating 106 of spectrograph 104. Grating 106 disperses light 117a into a spectrum 107a. The spectrum 107a lies on the Rowland circle 104a of spectrograph 104. The Rowland circle 104a is the circle on whose circumference lies the apex of grating 106, its spectral focus and the center of slits 105a and 105b. The Rowland circle 104 a of the said spectrograph 104 also lies on the normal plane of grating 106. The light from the said second reference light source 102 is collected and focussed into beam 110b by optical lens 118 at a second adjustable entrance slit 105b of spectrograph 104. A small portion of the light from reference light source 102 is collected by the first end of a light guide member 116b.

The design of the spectrograph 104 is such that the second entrance slit 105b is held by an adjustable stand 105c which also lies on said Rowland circle 105c. The adjustable stand 104b can be moved by a motor 901 (FIGS. 1 and 8) along a path which lies on the circumference of the Rowland circle 104a of spectrograph 104 either manually or electronically by means of microprocessor 900 and drive control electronics 700 as indicated in FIG. 1. The light 117b from the slit 105b is also focussed by grating 106 into a spectrum 107b at the said focal plane 107c. of grating 106. The spectra produced by light beams 117a and 117b are independently focussed at the common focal plane 107c to form a superimposed spectrum 107d. Slits 105a and 105b are cut on replaceable rectangular opaque masks 108a and 108b respectively. Slits 105a and 105b have fixed heights and widths. The height and width of the said slits may be changed to increase or decrease the spectral resolution of the apparatus, by replacing the masks 108a and 108b with ones having the required slit dimensions. The preferred width of the slits 105a and 105b can vary from 50 microns to 200 microns, with a fixed height of 12 mm. Mask 200 also lies on the focal plane 107c, and is positioned to completely block of the said superimposed spectrum 107d from passing through to detector 201. Slits 202a of mask 200 act as the only passageways for the superimposed spectrum 107d to detector 201. The slits 202a are made small enough to allow only a small portion of spectrum 107d to pass through them. By moving a slit 202a across the spectrum 107d, the detector 201 can make intensity measurement at each respective wavelength of the spectrum 107d.

In the preferred embodiment of this invention, mask 200 is constructed from a thin rigid disc of radius 50 mm and thickness of about 0.2 mm. A regular radial pattern of 12 equal slits 202a, 12 mm in length and 50 microns wide are cut radially from the circumference. Mask 200 is replaceable, and may be constructed with any number of slits with either a regular pattern or specially designed patterns to serve special purposes. Detector 201 used for this configuration is constructed with a first sensitive surface 201a and a second sensitive surface 201b respectively, on the same substrate. Each sensitive surface of the said detector 201 is capable of separate measurement of light intensity and separate analog electrical signal outputs. Detector 201 may also be constructed as a "self compensating" detector, so that the two said analog signals may be combined electronically by a light intensity control circuit 100 into a single analog electrical signal representative of a "corrected" intensity spectral signal at any given instant in time. It is advantageous to manufacture the two sensitive surfaces 201a and 201b on the same substrate, because a common substrate eliminates differences in physical characteristics between the two sensitive surfaces of the detector, so that thermal stresses or mechanical stresses will be the same for both detection surfaces. Detector 201 has a height of 500 microns and a total length of approximately 30 mm divided so that the first sensitive surface 201a of detector 201 has a length of 25 mm and the second sensitive surface 201b of detector 201 has a length of 5 mm.

Figure 7:
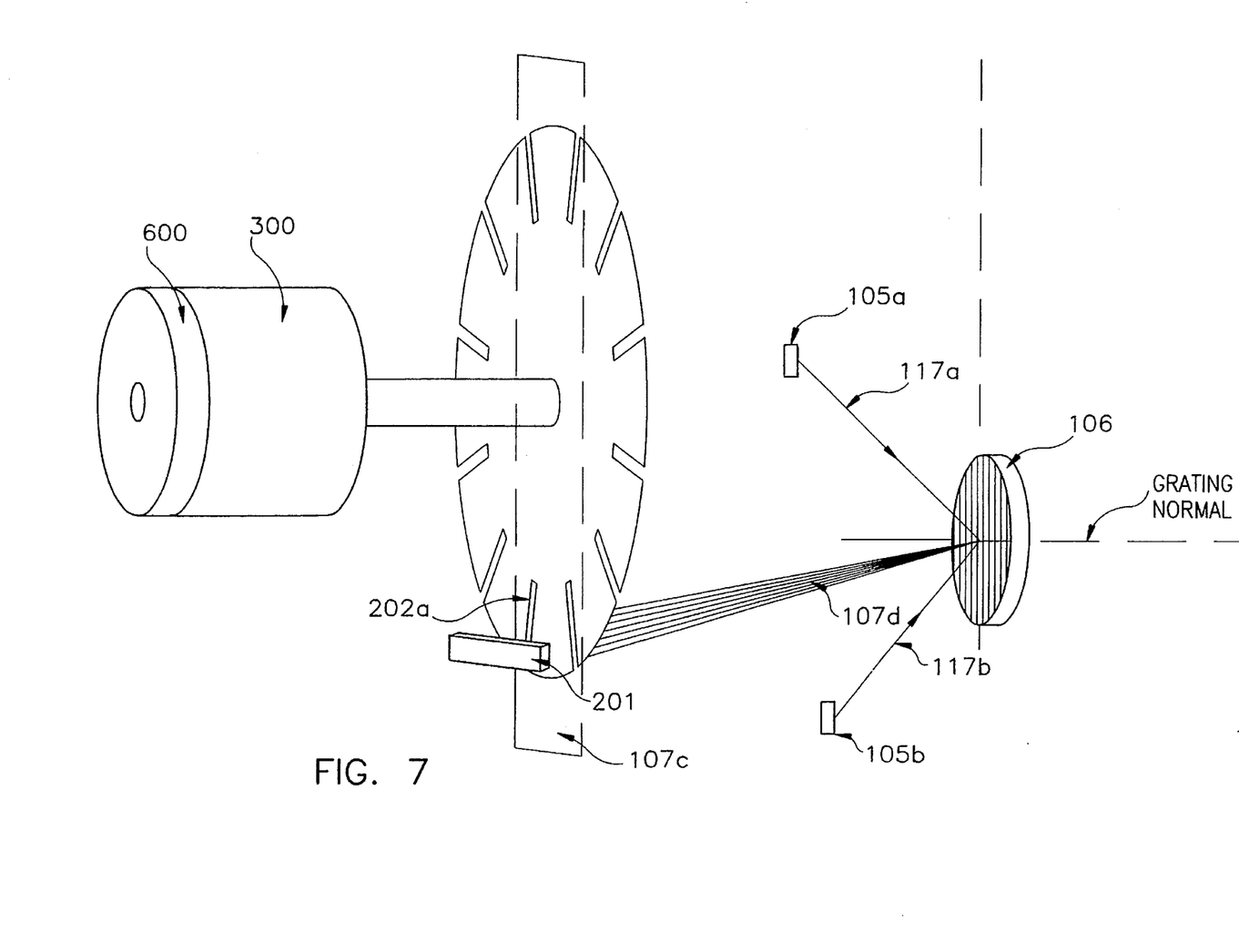
FIG. 7 is a simplified drawing of the mask and its spatial relationship to the detector element.
Figure 8:
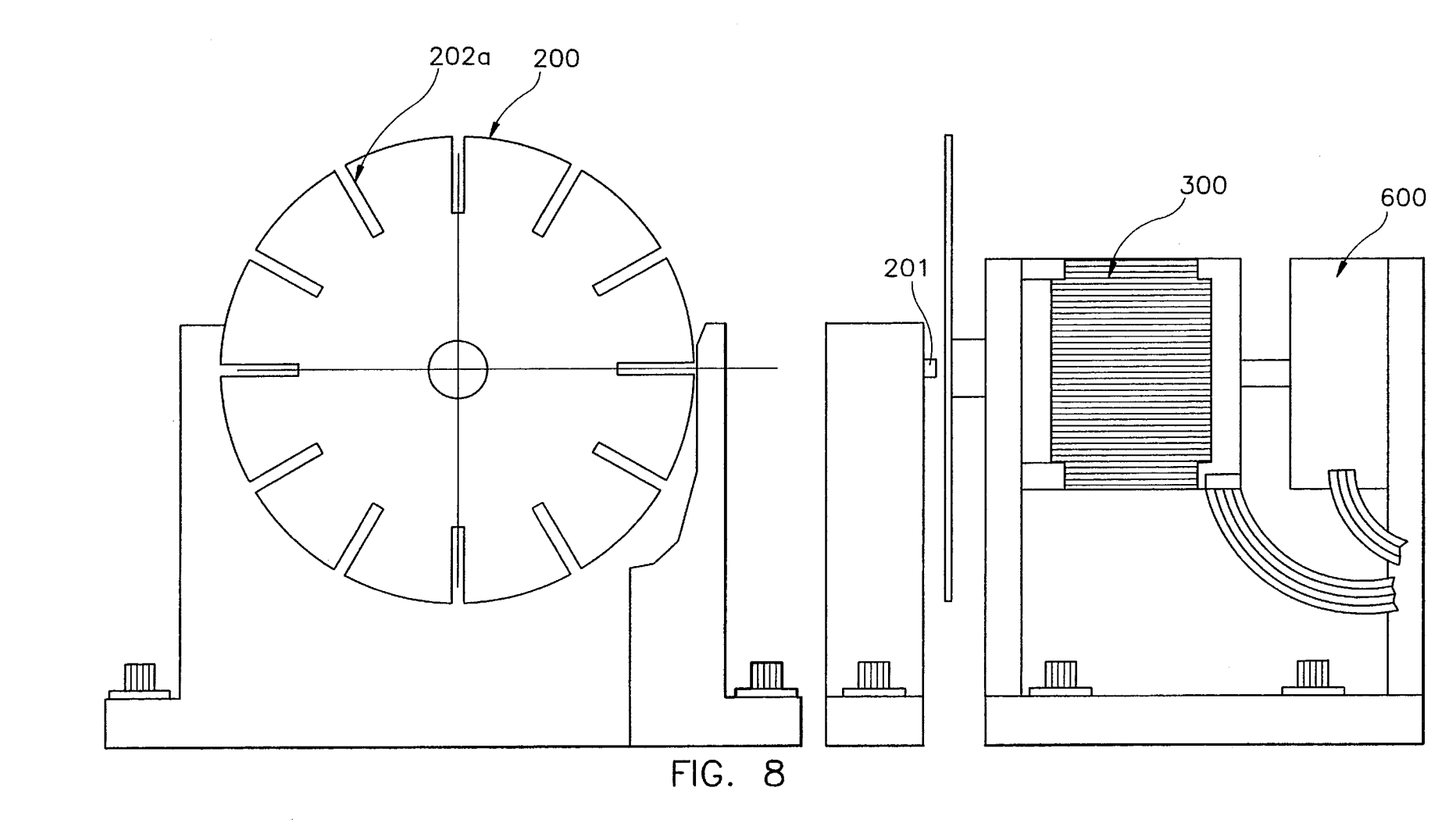
FIG. 8 is a frontal and side view of the mask with the radial slit pattern.
Figure 9:
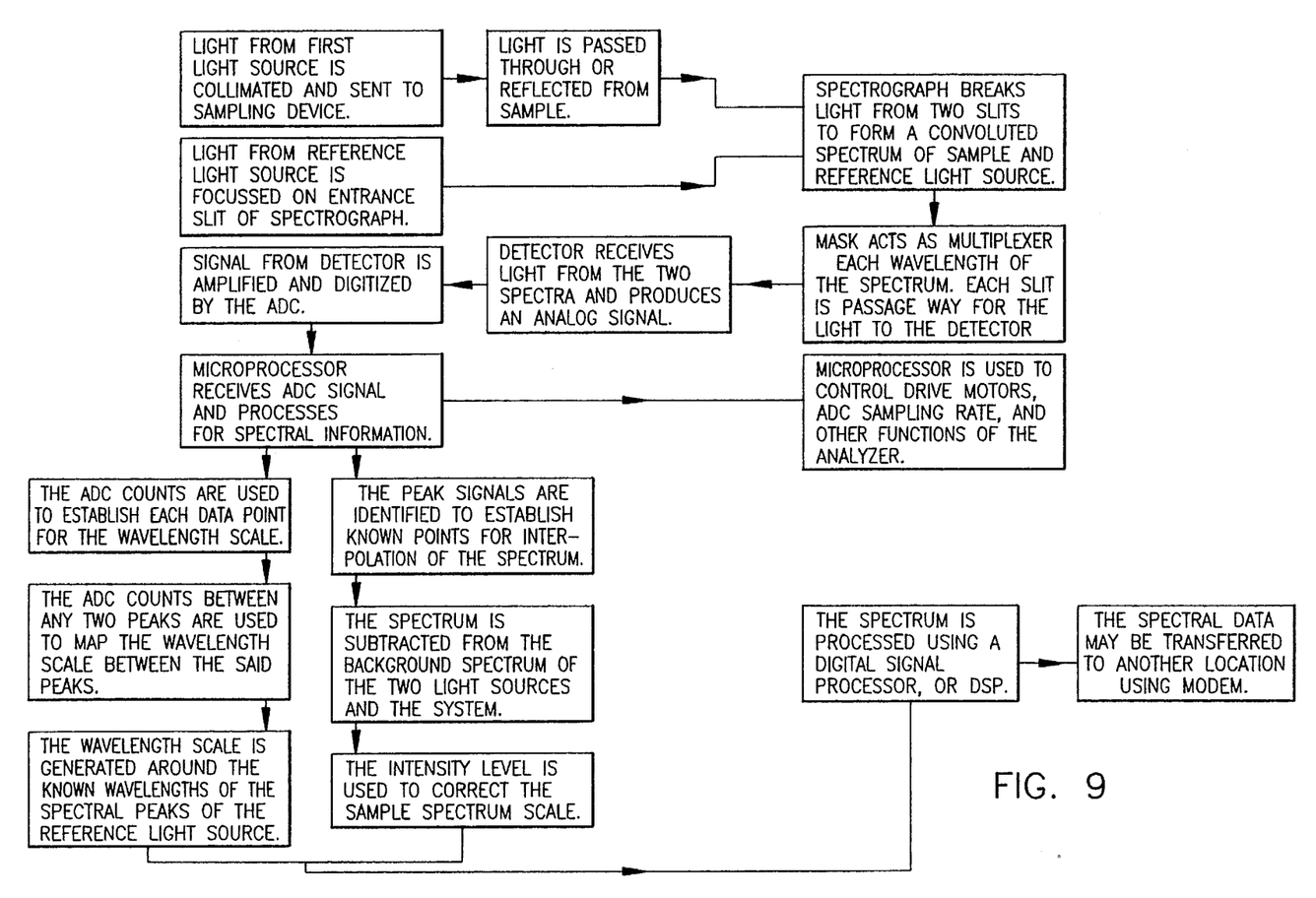
FIG. 9 is a flow diagram of a typical scan cycle of the apparatus.

Detector 201 is placed as close as possible to mask 200, with the said first sensitive surface 201a positioned within the longest cord segment between any two slits and the said second sensitive surface 201b extending tangentially from the mask 200 as shown in FIG. 8. As shown in FIG. 7, the sensitive surfaces 201a and 201b of detector 201 lie on a plane parallel to focal plane 107c immediately behind the mask 200 when viewed from the direction of grating 106. Detector 201 can be made to measure any portion of the spectrum 107d by rotating a particular slit 202a of mask 200 to that portion of the spectral distribution. The axis of rotation of mask 200 is perpendicular to the extended focal plane 107c and located above spectrum 107d as shown in FIG. 7. The center of the horizontal length of the first sensitive surface 201a of detector 201 is positioned at the center of the spectral distribution 107d tangential to the Rowland circle 104a. The sensitive surfaces of detector 201 are also perpendicular to and centered on the normal plane of grating 106. Mask 200 is driven by stepper motor 300. The step rate of motor 300 is accurately controlled by drive control electronics 700. The angular position of mask 200 is determined by optical encoder 600. Encoder 600 ensures accurate speed control of motor 300 and provides a means of determining the direction of rotation. The second ends of light guides 116a and 116b are permanently fixed at the second sensitive surface 201b of detector 201, to continuously illuminate the sensitive surface 201b.

Detector 201 is constructed of materials that are suitably chosen for the wavelength range required. Such materials include indium, gallium arsenide and lead sulphide. Such detectors are readily available from several manufacturers such as Mitsubishi Inc. of Japan, Hamamatsu Photonits Inc. of Bridgewater N.J.

The rotation of the mask 200 across the sensitive surface of detector 201 allows spectrum 107d to pass through each slit 202a respectively. The spectrum is chopped by each slit 202a so that only a small region of the said spectrum may pass through any given slit at any given time. This way, the detector 201 can be made to measure only a small single wavelength band of the spectrum 107d at any instant in time. Continuous rotation of the mask 200 allows the entire spectrum to be measured a single wavelength at a time. Only one slit 202a passes the spectral plane 107c at any given instant in time. Detector 201 generates an analog signal whose strength is proportional to the intensity of the light incident upon it. The signal is continuously sampled at a fixed rate and digitized by the analog to digital converter (ADC) 701 shown in FIG. 2.

CONTINUOUS SIMULTANEOUS WAVELENGTH CALIBRATION AND INTENSITY REFERENCE METHOD

WAVELENGTH CALIBRATION MODE (WCM)

Before apparatus 10 can be used to acquire spectral data it must be calibrated to recognize the wavelength scale for the measurements. This is done to define the wavelength region for the sample spectrum measurement, and to create an accurate wavelength scale for the said sample spectrum. The apparatus is set up for WCM by sending a particular sequence of commands to the microprocessor 900 using a computer as a terminal. The encoder 600 has a home pulse which is used by microprocessor 900 to initiate data acquisition. Apparatus 10 need only be calibrated once for any particular application. Because slits 105a and 105b are not at the same spatial location, the spatial location of the said spectra 107a and 107b will be independent. The independent spectra 107a, and 107b must first be positioned such that the wavelength of the first spectral peak $\Theta_o$ of spectrum 107b, coincides with a known reference wavelength of the spectrum 107a. This is done by dynamically moving the spectrum 107b using the motorized slit 105b until the first peak signal of spectrum 107b and a known peak signal of spectrum 107a coincide spatially. The method involves either an automated calibration routine controlled by microprocessor 900, or a manual calibration routine, both involving a fine tuning of the spatial location of the slit 107b. Firstly, the spectral region of interest is chosen by the user. For example the user may restrict the spectral range of interest from 200 nm to 1000 nm. A calibration filter with a known wavelength peak $\Theta_c$ just outside the spectral region of interest is placed in the path of the light from the said first light source 101 using a good reflector for a sample in port 112 of the apparatus. Such a filter will have a peak wavelength at say $\Theta_c$=198 nm. The calibration method is then carried out as follows:

a) Continuous Intensity Calibration

The intensity of the reflected sample light and the reference light source 102 are continuously monitored by the sensitive surface 201b of detector 201. the ADC 702 continuously digitizes combined signals from light guides 116a and 116b. The signal values are used to continuously establish a baseline for the intensity of the sample spectrum at each wavelength point.

b) Wavelength calibration

The peaks of the said second reference light source spectrum 107b can easily be identified by microprocessor 900. The intensity of the reference light source 102 is greater than the intensity of the first light source 101. Since the spectrum 107d is a superposition of spectra 107a and 107b (addition of 107a and 107b), the peaks of spectrum 107b will always occur above a given intensity threshold $I_s$. The threshold $I_s$, is determined by the intensity of the primary light source 101. Spectrum 107d will have the pronounced spectral emission peaks corresponding to the wavelengths of the second reference light source spectrum 107b. These peaks distinct from the spectral peak of the said sample filter at wavelength $\Theta_c$. Using the wavelength $\Theta_c$ as a fixed reference for the spatial distribution of the wavelength scale of the sample spectrum.

The relative location of the spectrum 107b of the reference source can be determined as follows. As the slit 202 exposes the detector 201 to the spectrum 107d of the said reference filter and the reference light source, an electrical signal is generated by detector 201. ADC 701 digitizes the said signal at fixed fast sampling rate $R_s$. The digitized signals are recorded in the memory of microprocessor 900 as spectral data. The time difference, or the number of analog to digital (A to D) counts between consecutive peak signals is also recorded by microprocessor 900. At the same time the motor 901 is powered by the microprocessor 900 to slowly move the spectrum 107b relative to the spectrum 107a, by moving the slit 105b along Rowland circle 104a. The recorded differences in times, or the number of A to D counts separating the peaks for each passing slit 202 is recorded. The time difference or the number of A to D counts recorded ; between any two particular peaks of the said reference light source spectrum 107b during the passage of any two consecutive slits will be almost constant. The time difference, or the number of A to D counts recorded between any peak of the spectrum 107b and the said calibration filter reference peak $\Theta_c$ during the passage of any two consecutive slits will be changing. The spectrum 107d will therefore be constantly changing. Microprocessor 900 is programmed to determine the relative time difference or number of A to D counts between the first spectral peak at wavelength $\Theta_o$ of the said reference spectrum 107b, and the calibration reference spectral peak at wavelength $\Theta_c$ for each slit 202. The object of the calibration is to control the motion of the motor 901 in order to make the time difference or A to D counts between the said two wavelengths $\Theta_c$ and $\Theta_o$ zero, so that they are spatially coincident on the spectral plane 107c. A feed back control loop is used to control the motor 901 to move the slit 105b in order to shift the spectrum 107b until the wavelength peak $\Theta_o$ and $\Theta_c$ coincide on the spectral plane 107c. After this is achieved the microprocessor 900 resets the apparatus 10 to Sampling Mode (SM).

SAMPLING MODE (SM)

After the (WCM) outlined above, the apparatus is ready for Sampling Mode. To initiate sample scanning and analyses, the user sends a set of commands to the microprocessor 900, using a computer as a terminal. Microprocessor 900 sets the apparatus for Sampling Mode (SM). The calibration filter is replaced by the sample to be scanned using either the direct mode or the remote mode of operation of apparatus 10. Mask 200 is automatically rotated to any of the said home positions of slits 202a and stops. Sampling mode operation involves an intensity measurement and a spectrum measurement. The intensity calibration for the spectrum of the sampling has been described above. Scanning is initiated by sending a command to microprocessor 900. The command could specify the scan rate, the time separating the said scans, the ADC sampling rate, the names of data files, and the sequence of processing of the data files. Microprocessor 900 is an integrated computer which includes a Digital Signal Processor DSP 902 for rapid computation, and rapid statistical analysis.

As a slit 202a exposes detector 201 to the spectrum 107d, an electrical signal is generated by the detector element 201 and digitized by the ADC 701 at a fixed fast sampling rate $R_s$. The data is stored by microprocessor 900 in memory. Each data point is defined by a three parameters:

(a) the sample count of the ADC 701 after determination and location of the reference peak $\Theta_o$, (b) the magnitude of the digitized detector signal, determined from the intensity of the light measured by detector surface 201a, (c) the intensity correction factor at that instant in time, determined by the intensity of light measured by detector surface 201b.

This information is then transferred to the Digital Signal Processor (DSP) 902 as it is acquired for computation of the spectrum and rapid analysis of the spectral data. The said DSP 902 is designed to analyze data at a very fast rate using special programmed algorithms. The computation of the spectrum is as follows:

(a) The intensity value of the sample light is measured by sensitive surface 201a of detector 201. this represents the intensity of a given wavelength of the superimposed spectra.

(b) An initial wavelength reference point $\Theta_o$ is obtained when the first peak signal is measured by the sensitive surface 201a of detector 201. The said first peak signal represents the first known wavelength peak $\Theta_o$ of the said second reference spectrum 107b, and therefore the known wavelength $\Theta_c$ of the said calibration filter. When the peak value is obtained, the microprocessor 900 resets the sampling count of the ADC to zero. The magnitude of each A to D count is recorded from then on.

(c) The peaks of the said second reference light source spectrum 107b can easily be identified by microprocessor 900. The intensity of the reference light source 102 is greater than the intensity of the first light source 101. Since spectrum 107d is a superposition of spectrum 107a and spectrum 107b, the peaks of spectrum 107b will always occur above a given intensity threshold $I_s$. The threshold $I_s$, is determined by the intensity "intensity calibration signal" obtained by surface 201b of detector 201.

(d) The sample counts $n_o, n_2, n_3 \ldots$ and time difference between two consecutive peaks of the spectrum 107d is determined by microprocessor 900. Microprocessor 900 now uses the known wavelength value of each peak signal of the spectrum 107d as known wavelengths of spectrum 107b. Microprocessor interpolates a wavelength scale between the said known peaks for spectrum 107d. The last known peak signal is used by the microprocessor 900 to determine the last reference point for the wavelength scale. The said last signal is also used to stop spectral data acquisition.

e) the spectrum is determined by microprocessor 900 by using the "intensity calibration signal" value at each sample point to compute a base measurement for the "spectral intensity signal" at the said sample point.

The wavelength scale so generated will primarily be determined by the spectrum 107b. The interval between the wavelengths of two consecutive peaks will have a resolution that depends on the speed of rotation of mask 200 and the sampling rate of the ADC 701. The resolution of measurement can be increased by slower rotation of mask 200 or increasing the ADC sampling rate, or a combination of both. For example the resolution of the wavelength scale can be doubled by reducing the speed of rotation of mask 200 by a factor of one-half.

In this embodiment of the invention, the microprocessor 900 is used to set the sampling rate of the ADC and the rotational speed of the mask 200. Motor 300 has a resolution of 50000 or more steps per revolution. This ensures that the stepper will resolve the wavelength scale into at least one-half nanometer per step.

Mask 200 rotates at a uniform speed of about 60 revolutions per second, so that 720 scans can be acquired per second can be acquired. The sampling rate of the ADC is set at about 200 MHz.

If "m" samples are taken from the wavelength interval spanning two consecutive peaks $\Theta_c$ and $\Theta_1$, the wavelength resolution will be $$R_\Theta = (\Theta_1 - \Theta_c)/m.$$

The spectral intensity at each sample count taken between and $\Theta_c$ and $\Theta_1$ will be $$[\Theta_c], [\Theta_c + (\Theta_1 - \Theta_c)/m], [\Theta_c + 2(\Theta_1 - \Theta_c)/m] \ldots [\Theta_1],$$

By knowing the absolute value of $\Theta_c$ (same wavelength as the calibration filter peak wavelength) the spectrum 107d can be mapped into the wavelength scale generated by the described method. This process is repeated for all the consecutive peaks of the said reference spectrum, thereby obtaining a continuous but dynamic wavelength scale of great accuracy for each scan. Each scan is completed when a slit 202a passes the last known spectral peak of the spectrum 107d. The process is repeated for each of the 12 slits 202a. Each passing slit 202a will produce an accurate spectrum of the sample in the wavelength region of interest.

Since the number of interpolated points on the wavelength scale is a function of the sampling rate of the ADC, the resolution of the method is theoretically limited only by the optical resolution of the apparatus. However in practice, the finite time constants and responsivity of the said detector element 200 and the stability of the said second reference light source will limit the accuracy of the method. This is also true for any other known method of spectral data acquisition.

The accuracy of the wavelength calibration method disclosed herein also depends on the closeness of the spectral peaks of the said second reference light source and the accuracy of the initial calibration routine. The novelty of the wavelength calibration method disclosed in this invention lies in the fact that no encoder is needed to define the wavelength scale. The detector 201 and the spectrum 107b of the reference are used to perform the functions of an encoder. The speed of the motor 300 need not be very accurate, since the disclosure reveals a method measuring the speed at different regions of the spectrum, and compensating for speed variations at different regions of the spectrum.

The novelty of the intensity calibration method disclosed lies in the fact that the method completely eliminates any ambient light character from the measurement at each wavelength. The method also eliminates any light source variations in the apparatus, or outside the apparatus. It is thus a very suitable method for process instrumentation design.

Figure 10:
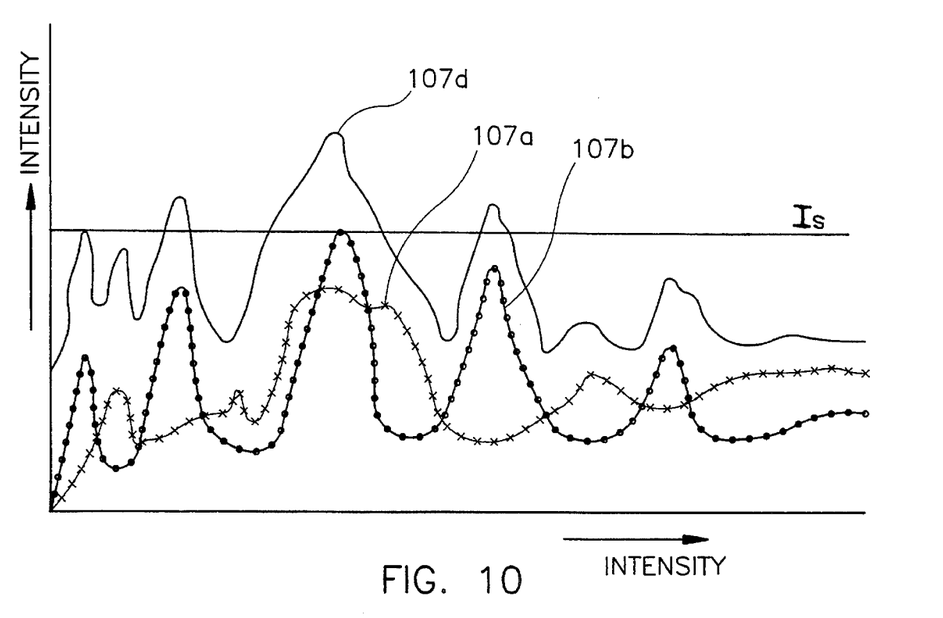
FIG. 10 shows graphs of the superimposed reference and sample spectrum and the extracted sample spectrum respectively.

FIG. 10 shows graphs of the superimposed reference and sample spectrum and the extracted sample spectrum respectively.

The sample spectrum $S_a$ can be extracted from the spectrum 107d by taking a reference background spectrum $S_r$ of the system with no sample in the path of the light from the said first source, and subtracting this from the spectrum 107d. The final spectrum of the sample is obtained by subtracting the baseline $S_b$ of the intensity calibration signal.

In principle, it is possible to compensate for detector slew rates, and responsivity using the method here disclosed, since the time constant associated with the measurement of the wavelength scale using the reference spectrum 107b also apply directly to the said spectrum 107d.

The method of wavelength calibration disclosed in this invention allows the wavelength scale to be dynamically imprinted on detector element 201 at each and every scan cycle of apparatus 10. Because there is no time difference between a sample measure scan and a wavelength reference or calibration scan, the wavelength scale generated for the said measurement is very accurate. Also the potential errors introduced by using an encoder 600 to determine the spatial location of the said rotating mask 200 are reduced by the present invention, since the wavelength scale is ultimately determined by the dispersion of the spectrum 107b of the said second reference light source 102 and not by an independent entity such as encoder 600. A variation in the properties of grating 106 for example, cannot affect the said wavelength scale generated by the method here described, since such errors are automatically corrected by interpolation between the known spectral peaks of the sample.

Almost all existing instruments, (moving grating or stationary grating) use methods independent of the spectrum itself to determine the wavelength scale for both the sample spectra and the reference spectra. For example instruments using static diode arrays depend on the spacing of the detector array and the spectrum to determine the wavelength scale. A detector with N elements spanning a wavelength region of L nanometers divides the wavelength scale into L/N segments. Variations in L will affect the wavelength scale of such instruments. Moving gratings on the other hand use optical encoders to define the wavelength scale. Relative motion of the encoder shaft and the moving grating mass results in wavelength scale errors. Furthermore, the present invention accounts for errors due to non-linearity of the spectrum as a result of thermal and mechanical stresses on the grating of the spectrograph and detector substrate. These errors are automatically corrected by the said method of interpolation discussed above. Non-linearity can manifest in varying degrees at different regions of the said spectrum 107d. The interpolation routines between fixed known wavelengths of the said spectrum of the said second reference light source should minimize these effects.

I claim:

1. An apparatus for the spectral analysis of the composition of a sample, said apparatus comprising:

a first light source optically coupleable to the sample for illuminating the sample;

a second light source;

A spectrograph having a first entrance aperture optically coupled to the sample for collecting at least a portion of the light dispersed from the sample and a first second entrance aperture optically coupled to said second light source, each of said first and second apertures lying on a common Rowland circle, said spectrograph also having a diffraction grating positioned to receive light from said first and second entrance apertures and to disperse a combined spectrum thereof onto a first photo-sensitive transducer, said first photo-sensitive transducer having a first photo-sensitive surface at least a portion of which is located substantially on said Rowland circle; and a movable mask optically interposed between said grating and said transducer, said mask including a plurality of openings arranged to intermittently expose said first surface to said spectrum as said mask is moved.

2. The apparatus of claim 1 wherein said mask is movable rotatably and wherein said openings are disposed radially about an axis of rotation of said mask.

3. The apparatus for claim 1, further comprising a light intensity control for controlling the intensity of at least one of said first light source and said second light source.

4. The apparatus of claim 1, wherein said first light source comprises a source for emitting light having a wide wavelength range and substantially no prominent spectral peaks and said second light source comprises a source for emitting light which includes a plurality of prominent spectral peaks.

5. The apparatus of claim 4 wherein said wide wavelength range is a range primarily within the visible near infrared range of the electromagnetic spectrum and said prominent spectral peaks of said second light source include peaks lying in the visible and near infrared region of the electromagnetic spectrum.

6. The apparatus of claim 1 wherein said diffraction grating comprises a concave holographic grating.

7. The apparatus of claim 3, further comprising:

a second photo-sensitive transducer and optical path means for conducting to said second photo-sensitive transducer a portion of said light dispersed from said sample as well as a portion of light emitted from said second light source, said second photosensitive transducer being coupled to said light intensity control for controlling said intensity of said at least one of said first and second light sources.

8. The apparatus of claim 7 wherein said first and second photosensitive transducers are formed on a common substrate.

9. The apparatus of claim 1 further comprising means for effecting relative movement along said Rowland circle between said first and second entrance apertures.

10. An apparatus for the spectral analysis of the composition of a sample, said apparatus comprising:

a first light source optically coupleable to the sample for illuminating the sample with first light having a wide wavelength range and substantially no prominent spectral peaks;

a second light source capable of emitting second light which includes a plurality of spectral peaks lying within said wavelength range, at least some of said spectral peaks being of an intensity greater than that of said first light source; a spectrograph having a first entrance aperture optically coupled to the sample for collecting at least a portion of the light dispersed from the sample and a second entrance aperture optically coupled to said second light source, each of said apertures lying on a common Rowland circle, said spectrograph also having a diffraction grating positioned to receive light from said first and second entrance apertures and to disperse a combined spectrum thereof onto a first photo-sensitive transducer having a first photosensitive surface at least a portion of which is located substantially on said Rowland circle, and a second photo-sensitive transducer;

a movable mask optically interposed between said grating and said first transducer, said mask including a plurality of openings arranged to intermittently expose said first surface to a portion of said spectrum as said mask is moved;

optical path means for conducting to said second photo-sensitive transducer a portion of said first light dispersed from said sample as well as a portion of said second light emitted from said second light source; and computing means interfaced to said first and second transducers for determining a wavelength scale based on the wavelengths of said at least some of said spectral peaks.

11. The apparatus of claim 10 wherein said first and second photosensitive transducers are formed on a common substrate.

12. The apparatus of claim 10 wherein said computing means further includes means for extracting a spectrum of the sample based on said combined spectrum, the spectral positions of said at least some of said spectral peaks and an intensity correction factor, said intensity correction factor being correlated to changes in the intensity of said portion of said first light dispersed from said sample and said portion of said second light emitted from said second light source.

13. The apparatus of claim 12 further comprising means coupled to said computing means for transmitting and receiving data to and from a remote location.

* * * * *